(No Model.)
C. WYNN.
WHEEL TIRE.
No. 494,947. Patented Apr. 4, 1893.
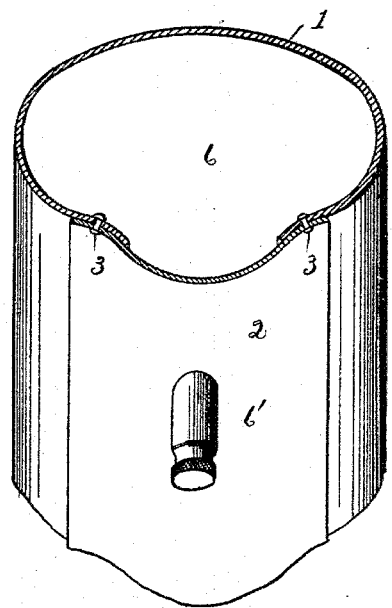
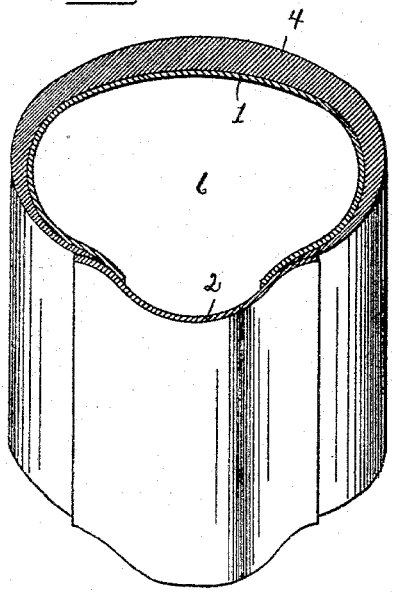 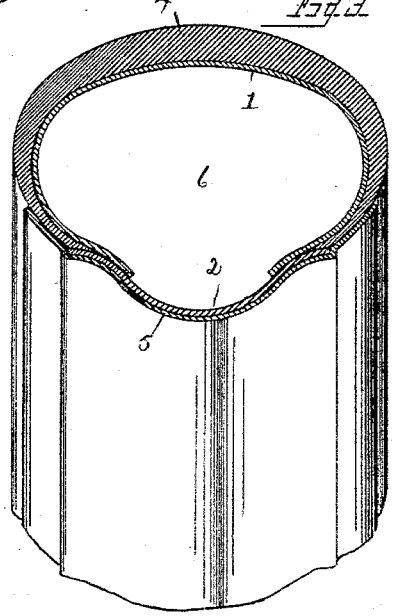
WITNESSES
Carroll J. Webster
Floyd R. Webster
INVENTOR
Calvin Wynn
By William Webster
Atty

UNITED STATES PATENT OFFICE.

CALVIN WYNN, OF TOLEDO, OHIO, ASSIGNOR OF ONE-THIRD TO WILLIAM H. STANDART, OF SAME PLACE.

WHEEL-TIRE.

SPECIFICATION forming part of Letters Patent No. 494,947, dated April 4, 1893.

Application filed October 8, 1892. Serial No. 448,199. (No model.)

*To all whom it may concern:*

Be it known that I, CALVIN WYNN, of Toledo, county of Lucas, and State of Ohio, have invented certain new and useful Improvements in Wheel-Tires; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a wheel tire, and has more especial relation to that character of wheels employed upon bicycles, tricycles, sulkies, &c., the object being to provide a light, durable, inexpensive and yielding tire capable of being used with an air cushion or vacuum and adapted to any form of traction covering.

The invention consists in the parts and combination of parts hereinafter described and pointed out in the claims.

In the drawings: Figure 1 is an elevation of a section of rim with my improved tire secured thereto by riveting. Fig. 2 is a like view showing the tire secured to the rim, and the traction surface interposed between the two. Fig. 3 is a transverse section of the tire showing the same covered with a traction surface, and the rim also covered with an air tight covering.

In forming the tire I employ an annulus 1 of sheet steel preferably curved to form an elliptical tube when secured to the rim 2, the major axis of the ellipsis being transversely of the tread of the wheel, whereby the peripheral bearing of the tire is allowed a resiliency of action through the minor axis, as the curvature of the sides yield to the pressure upon the periphery. Tire 1 is secured to rim 2 in any preferred manner.

As shown in Fig. 1 the two parts are secured by rivets 3 and may also be brazed as it is preferable to construct the tire air tight.

In Fig. 2 the traction surface 4 is formed of rubber and interposed at each edge between the tire and rim and the parts are vulcanized into homogeneity forming an air tight union at the point of joinder.

In Fig. 3 the tire and rim are shown as joined, and in this construction it is immaterial how they are joined, whether by rivets, brazing of vulcanizing, the essential feature of the construction being in an air tight covering 5 of raw hide, rubber, canvas or analogous material which covers the rim and extends past the joinder of the rim and tire and is cemented or otherwise secured to the traction covering 4, whereby the tire may be sustained yieldingly by an air cushion by filling the annular chamber 6 with air through pipe 6', or rendered more yielding by exhausting the air therefrom. It will be seen that by this means the tire may be adapted to riders of different weight, as the air may be forced into the tire under a compression to limit the flexure of the tread to a minimum, or exhausted to allow of the greatest flexure.

In the use of the tire as described all of the advantages of the present pneumatic tire are attained such as the necessary yield to unevenness and irregularity of the roadway, with a maximum traction with the advantage of lightness and greater durability, as well as avoiding all danger of collapsing by reason of a puncture and escape of air.

In securing the rim and tire by means of bolts or rivets there is preferably a layer of compressible material interposed between the two to cause an air tight joint.

What I claim is—

1. In a wheel, the combination with the metallic rim, of a tire of thin sheet metal essentially circular in cross section, the free ends of the tire being secured to the edge of the rim, and providing an air tight joint to prevent the escape of air.

2. In a wheel, the combination with a metallic rim, of a thin sheet of metal tire secured at the free ends to the edges of the rim, and a traction covering surrounding the tire and secured between the free ends of the same and the edges of the rim to make a tight joint.

In testimony that I claim the foregoing as my own I hereby affix my signature in presence of two witnesses.

CALVIN WYNN.

Witnesses:
WILLIAM WEBSTER.
CARROLL J. WEBSTER.